United States Patent
Chigurupati et al.

(10) Patent No.: US 6,251,443 B1
(45) Date of Patent: Jun. 26, 2001

(54) METHOD FOR PRODUCING A SAVORY FLAVOR BASE

(75) Inventors: Sambasiva R. Chigurupati, Omaha, NE (US); Kantilal G. Parekh, Elmwood Park; William A. May, Hackettstown, both of NJ (US)

(73) Assignee: United Specialty Flavors, Inc., Carol Stream, IL (US)

( * ) Notice: Subject to any disclaimer, the term of this patent is extended or adjusted under 35 U.S.C. 154(b) by 0 days.

(21) Appl. No.: 09/295,264

(22) Filed: Apr. 20, 1999

(51) Int. Cl.$^7$ ...................................................... A23L 1/28
(52) U.S. Cl. .................. 426/18; 426/44; 426/41; 426/52; 426/656; 426/49
(58) Field of Search .................. 426/49, 44, 46, 426/18, 32, 52, 656

(56) References Cited

U.S. PATENT DOCUMENTS

| | | | | |
|---|---|---|---|---|
| 3,852,479 | * | 12/1974 | Yokotsuka et al. | 426/44 |
| 3,912,822 | * | 10/1975 | Yokotsuka et al. | 426/44 |
| 4,315,946 | * | 2/1982 | Greiner et al. | 426/66 |
| 4,356,209 | * | 10/1982 | Bryan et al. | 426/627 |
| 4,466,986 | * | 8/1984 | Guggenbuehler et al. | 426/533 |
| 4,874,625 | * | 10/1989 | Hartman | 426/533 |
| 5,077,062 | * | 12/1991 | Ernster | 426/46 |
| 5,876,778 | * | 3/1999 | Stewart | 426/658 |
| 6,024,990 | * | 2/2000 | Kofoed et al. | 426/44 |

OTHER PUBLICATIONS

Savory Flavors publication, Author—Tilak W. Nagodawithana, Universal Foods Corporation, Milwaukee, Wisconsin, Chapter 6—Protein Hydrolsates—Past and Present, pp. 225 through 262.

Savory Flavors publication, Author—Tilak W. Nagodawithana, Universal Foods Corporation, Milwaukee, Wisconsin, Chapter 7—Savory Spices, pp. 223 and 224.

* cited by examiner

Primary Examiner—Milton Cano
Assistant Examiner—Phillip Dubois
(74) Attorney, Agent, or Firm—Polsinelli Shalton & Welte, P.C.

(57) ABSTRACT

The present invention relates to a method for producing a flavor base which then can be used to form savory flavor or flavor enhancer products. The method involves enzymatically hydrolyzing cereal grain cereal protein, in particular defatted wheat germ, to produce the flavor base.

10 Claims, No Drawings

METHOD FOR PRODUCING A SAVORY FLAVOR BASE

FIELD OF INVENTION

The present invention relates to a method for producing a savory flavor base, wherein the method includes enzymatically hydrolyzing an amount of cereal protein raw material, most preferably defatted wheat germ, with at least one enzyme. The present invention also relates to methods for forming savory flavor and flavor enhancer compositions from the savory flavor base.

BACKGROUND OF THE INVENTION

Savory flavors and flavor enhancers, made from flavor bases such as hydrolyzed vegetable protein (HVP), yeast extract, monosodium glutamate (MSG), and nucleotides are added to food products to enhance the existing flavors of food products or to impart additional or enhanced flavors to food products. The savory flavor imparts a spicy, meaty profile to food products containing the savory flavor. Flavor enhancers intensify flavors already existing in a food product. Essentially, the flavor enhancers and savory flavors have a synergistic effect with flavors already existing in a food product so that when the food product is consumed by a person they will more readily taste the flavors found in the food products. Often the savory flavors and flavor enhancers work to enhance vegetable, meat, cheese, and seafood flavors of various products. Among the food products that savory flavor and flavor enhancers are used in are soups, gravies, meats, snacks (such as snack crackers and chips), breakfast foods, and canned and frozen meat products. As such, savory flavors and flavor enhancers are used in a wide variety of food products to enhance taste.

HVP is a savory flavor base often used to form savory flavors and flavor enhancers, with the HVP generally described as either a flavor donor, a flavor enhancer, or a combination thereof. The HVP can be formed by hydrolyzing a vegetable protein with an acid or an enzyme. The protein or raw material used to form the HVP typically includes one of the following: wheat gluten, corn gluten, defatted wheat germ, defatted soy flour, defatted peanut flour, and defatted cottonseed flour. Wheat gluten is often the preferred raw material because it has an increased amount of glutamic acid which will allow often for the production of an HVP that has a less bitter, sweeter flavor. The less bitter, sweeter flavor is similar to a yeast extract, meaning the HVP can be used as a replacement for the yeast extract when formulating a savory flavor base. It is desired to use an HVP as opposed to a yeast extract as yeast extracts are comparatively expensive to produce and use. Unfortunately, wheat gluten can be expensive to use as a raw material. Thus, it is desired to have a more economical replacement, such as an HVP, for a yeast extract.

Defatted wheat germ when used to form an HVP imparts a desired flavor; however, it also suffers from being expensive to use. It is known that defatted wheat germ contains about 30% by weight peptides or protein. As such, typically the yield of HVP from defatted wheat germ is decreased. Conversely, when defatted soy flour is used to form the HVP, the soy flour typically contains at least 50% by weight protein. Because of the lesser amount of protein found in the defatted wheat germ, a lower yield is realized which in turn makes it less economical to use. Another problem associated with defatted wheat germ is that it is a processed product or an "end" product. This will also increase the cost associated with producing an HVP from defatted wheat germ as the raw material has a higher comparative cost than other raw material. It is desired to produce an HVP from defatted wheat germ that has a sufficient yield and is economical to form.

Soy proteins or derivatives from soybeans are typically used to form HVP. Unfortunately, HVPs derived from soy tend to have a bitter flavor that is unsuitable for many savory flavor applications. For this reason, it is desired to produce an HVP from a raw material other than soy. Also, most HVP's, including those formed from wheat gluten and soy, typically have a high salt content. Generally, the salt content in an HVP will range between about 40% and 45%. It is desired to produce an HVP having a lesser salt content.

Acid hydrolysis is currently the most practiced enzymatic method for producing an HVP. In the acid hydrolysis method an amount of acid is mixed with an amount of vegetable protein, soy protein for example, with the acid hydrolyzing the protein. The acids used to hydrolyze the vegetable protein starting material include sulfuric acid and hydrochloric acid, with the hydrochloric acid the most commonly used hydrolyzing agent. When HVPs are made with sulfuric or hydrochloric acid they will typically contain an amount of sodium or potassium chloride as a result of the neutralization process which is performed to adjust the pH of the HVP.

Acid hydrolysis, even though it is the most frequently used commercial method, unfortunately suffers from potentially producing a flavor base having too much salt. Also, acid hydrolysis can impart negative or undesirable flavors to the flavor base, which is an undesired result. It may also be true that acid and/or alkaline hydrolysis can destroy L-form amino acids, cause formation of D-form amino acids, and formation of toxic substances such as lysio-alanine (Lehl and Grindstaff 1989). Recently, it has been shown that the process of hydrolysis using HCl can lead to the production of chloropropanols which are known to be carcinogenic. This is especially troublesome if the savory flavor product is to be marketed in Europe where there are specific limits as to the amount of chloropropanols that can be present in a food product. A further problem is that the acid hydrolysis method can be relatively expensive to perform. Thus, there is a desire for a method for producing HVP products that does not involve an acid hydrolysis process.

It should be pointed out that salt free HVP products can be obtained by using sulfuric acid to hydrolyze the vegetable protein and then neutralizing the HVP solution with calcium hydroxide. This, however, is a comparatively more expensive method. As such, it is desired to have an inexpensive method for providing a substantially salt free HVP.

As mentioned, it is known to also use enzymatic hydrolysis to hydrolyze vegetable protein, with the hydrolyzed vegetable protein then available for use as a flavor base. Enzymatic hydrolysis suffers from typically resulting in incomplete hydrolysis of the vegetable protein and from generation of peptides that impart a bitter taste to the savory flavor. Thus, it is desired to be able to hydrolyze a vegetable protein with an enzyme, whereby the hydrolysis is complete and the finished HVP is not overly bitter.

When enzymatic hydrolysis is performed, a flavor base is produced, with the flavor base having a variety of different flavors and flavor nuances which are dependent in-part upon the specific enzymes selected to hydrolyze the vegetable protein. Thus, different flavors can be imparted to the flavor base dependent upon the enzymes selected to hydrolyze the vegetable protein. Also, HVP flavor bases produced by enzymatic hydrolysis will have a different flavor than HVP flavor bases produced by acid hydrolysis. Soy bean meal or other soy vegetable proteins are used typically to form the hydrolyzed vegetable protein. Like the enzymes or acids, the particular protein selected will influence the flavor of the flavor base. As such, it is desired to have a method for producing different flavors in flavor bases than what is currently known. It is also desired to have a method which does not use a soy protein as the protein for forming the HVP. In particular, it is desired to have a method for producing an HVP that will have a slightly sweet taste, as opposed to a bitter taste.

An example of a typical method used to form an HVP flavor base includes placing 1600 Kg of soy bean meal in a vessel with 1100 Kg of water and 1500 Kg of 30% hydrochloric acid (HCl). The mixture is then heated to a temperature ranging between 100° C. and 120° C. for 2.5 hours at two (2) atmospheres of pressure. The mixture is then cooled to 50° C. and neutralized with 50% sodium hydroxide to a pH of about 5.6, with the pH ranging anywhere from 4 to 6. The mixture is then cooled and filtered to separate insoluble material from a protein filtrate. After this, the protein filtrate is concentrated to a paste and further dried by roller drying, spray drying, or oven drying. Prior to drying, the filtrate can have constituents, such as salt, added thereto, with the dried filtrate then ready to be used as a savory flavor or flavor enhancer. This method will result in a flavor base having a distinct taste or flavor.

In addition to HVP, as mentioned, yeast extract or yeast autolysates can be used as a flavor enhancer and/or a savory flavor. The yeast autolysate is produced from common yeast, *Saccharomyces cerevisiae,* which are obtained as a bi-product of beer production or may be specially grown in a suitable sugar medium. If the yeast obtained as a bi-product of beer production is used, it is first made into a slurry. The slurry will produce the best conditions for autolysis of the yeast cells by enzymes contained within the yeast cells. As such, enzymes, mainly proteases, cause the breakdown of protein present within the yeast cell to polypeptides and then to amino acids. Once autolysis is completed, a liquor is produced that retains the insoluble cellular material and other unwanted materials, so that the liquor is separated from the remainder of the hydrolyzed material. The hydrolyzed material is then concentrated into a paste or dried to a powder. It is then ready for use as a savory flavor or flavor enhancer. As such, when the yeast autolysates are produced the soluble material is separated from the insoluble material with the soluble material used as the yeast extract. Yeast autolysates will have a unique taste that is different than most HVP products.

In the food industry it is necessary to have a variety of different flavors as consumers more and more demand new and different flavors. For this reason, it is necessary to develop new flavor enhancers and savory flavors, and more particularly, new flavor bases, that have slightly different tastes and characteristics which consumers demand. Thus, it is desirable to have a new HVP that is not formed from soy or by acid hydrolysis, and that has new and different flavors that have previously not been known in HVP products.

Previous methods for producing flavor bases that have been used have suffered from a number of problems including being costly and having undesirable flavors. Thus, a less expensive method for producing HVP is desired. Further, it is desired to have an HVP with different flavors, especially sweeter, less bitter flavors. Also, previous methods have resulted in a product that may contain an undesirable amount of salt, as well as, being potentially carcinogenic. For this reason a potentially more healthful HVP flavor base is desired.

SUMMARY OF THE INVENTION

The present invention relates to a method for producing a savory flavor base from a cereal protein, preferably defatted wheat germ, wherein the savory flavor base is formed from enzymatically degraded protein. More particularly, the present invention relates to a method for producing a savory flavor base from cereal grain protein, especially defatted wheat germ, to produce a new and novel savory flavor base having a different taste than what is presently known in other hydrolyzed vegetable protein (HVP) savory products, while still having characteristics similar to known HVP savory products. It is also preferred if the savory flavor base has a taste that is slightly different than a yeast extract. Most importantly, it should be pointed out that enzymatically hydrolyzing cereal grain protein, especially defatted wheat germ, will produce an HVP or a savory flavor base that has unknown and different flavors from what has been previously produced from other HVP products, especially soy protein products. As such, this is an important new invention because consumers demand healthier, safer, new and different savory flavors and the use of an enzymatically hydrolyzed cereal grain protein, in particular defatted wheat germ, will provide for new and different savory flavor and flavor enhancer products. Also, HVP products produced by enzymatically hydrolyzing defatted wheat germ are novel and are believed to have not been manufactured previously.

The present process is initiated by forming a cereal protein slurry by mixing an amount of cereal grain protein with an amount of water. More preferably, the present process is initiated by forming a slurry from an amount of defatted wheat germ and water. Because the defatted wheat germ is preferred, it will be referred to throughout even though potentially other cereal grain proteins could be used in this process. Preferably, the defatted wheat germ slurry is then pasteurized, followed by cooling. To the pasteurized wheat germ slurry a variety of enzymes can be added, with the enzymes added dependent upon the desired flavor characteristics of the flavor base to be produced by the hydrolysis of the defatted wheat germ and dependent upon the pH of the defatted wheat germ slurry. As the enzymes degrade proteins, the pH will be lowered, so that it may be necessary to include enzymes which more readily hydrolyze protein at lower pHs so that as time passes hydrolysis will continue regardless of the pH of the fermenting defatted wheat germ slurry. For this reason, it is desired to use more than one enzyme to produce the savory flavor base. It should be emphasized that the combination of the defatted wheat germ and the enzymes will produce a unique flavor base or HVP that has been previously unknown.

After fermentation of the defatted wheat germ slurry, it is preferred to then pasteurize the defatted wheat germ slurry to prevent further enzymatic degradation and to inactivate the enzymes. The defatted wheat germ slurry will then be filtered to separate insoluble materials, and materials which negatively influence the flavor of the savory flavor base, from the soluble protein hydrolysate or flavor base. Upon conclusion of filtering, the savory flavor base can be further concentrated, as well as, having colors, flavors, and other constituents added thereto to form either a savory flavor or a flavor enhancer. Again, this is a new and novel method because it has not been known to enzymatically hydrolyze defatted wheat germ to produce an HVP or savory flavor base. This results in new and novel savory flavors which have not been previously known and which will allow for new and different types of flavor enhanced food products.

This method is advantageous because a savory flavor having a new desirable flavor is produced from an HVP or flavor base. The savory flavor will have a less bitter, sweeter flavor, while having strong beef and chicken flavors. Further, the present savory flavor will generally have a lesser amount of salt, meaning it is a healthier savory flavor. The present method is also desirable because it is economical as the raw material, the defatted wheat germ, is occasionally a by-product or is considered a waste product with little economic value. Also, unlike previous enzymatically treated proteins, the yield in the present invention is adequate so that the present invention is inexpensive and has suitable yields from the raw material.

DETAILED DESCRIPTION OF THE INVENTION

The present method relates to the production of a savory flavor base or HVP and a savory flavor and flavor enhancers resulting from enzymatically treating a cereal product, preferably a cereal protein such as defatted wheat germ. The defatted wheat germ will be referred to throughout since it is the raw material and cereal protein of choice. More specifically, the present method relates to the production of a protein hydrolysate or HVP from the defatted wheat germ, with the enzymatically hydrolyzed defatted wheat germ forming a savory flavor base. The hydrolyzed wheat germ can have additional constituents added thereto so that it may be dried to form a savory flavor or flavor enhancer. The present method involves hydrolyzing the defatted wheat germ by using at least one suitable enzyme in a desired amount.

The method is initiated by selecting an amount of defatted wheat germ and mixing such wheat germ with an amount of water to form a wheat germ slurry. The wheat germ can be added to the water in an amount equal to between about 10% and about 20% by weight of said wheat germ slurry, with the amount of wheat germ added dependent upon a variety of factors. The amount of wheat germ added to form the wheat germ slurry will depend upon the particular proteases used, as different proteases break down peptides into amino acids with different efficiencies, the time allowed for fermentation, the particular flavor profile desired, and the amount of protein found in the defatted wheat germ material.

The protein of the present method can be selected from the group consisting of cereal grain protein and soy bean derived vegetable protein, including soy grit, soy flakes, soy isolate, soy concentrate, and combinations thereof. The cereal grain protein is most preferred because of the different flavors that can be developed from the cereal grain protein. Among the available cereal grain proteins are defatted wheat germ, pea protein, defatted corn germ, wheat gluten, corn flour, oat meal, peanut protein, and combinations thereof. The most preferred cereal grain protein, as noted, is the defatted wheat germ.

In addition to the defatted wheat germ, an amount of salt, preferably sodium chloride (NaCl), can optionally be added to the defatted wheat germ slurry. Generally, the salt will be added in an amount ranging between about 0% and about 10% by weight of the defatted wheat germ slurry and more preferably in an amount ranging between about 5% and about 10% by weight of the defatted wheat germ slurry. The salt is added to secure the microbial stability of the defatted wheat germ slurry for several days of incubation at control temperature conditions. Also, the salt when added in a desired amount will favorably influence the flavor of the savory flavor base.

It is preferred to then heat and mix the defatted wheat germ slurry at a sufficient temperature for a sufficient amount of time to prevent bacterial spoilage during enzymatic hydrolysis. As such, preferably the defatted wheat germ slurry is pasteurized or heat treated at a sufficient temperature to kill bacteria, but at a temperature that does not produce a maillard reaction. A desirable pasteurization process includes heating the defatted wheat germ slurry to a temperature of 95° C. for approximately 3 hours.

After heating, it is necessary to cool the defatted wheat germ slurry and to adjust the pH so that an enzyme friendly environment is produced. Preferably, the defatted wheat germ slurry is cooled to about 45° C. and the pH is adjusted to approximately 7, however, other environments can be used dependent upon the enzyme or enzymes added to the defatted wheat germ. Thus, the pH will be adjusted dependent upon the enzyme or enzymes used to hydrolyze the defatted wheat germ. Different enzymes will thrive under different pH conditions. The pH can be adjusted using any basic compound that will adjust the pH from a more acidic level to a more neutral level without imparting any undesirable health effects to the defatted wheat germ slurry or unsuitable flavors. An example of a suitable composition for adjusting the pH is sodium hydroxide (NaOH).

Once a suitable environment has been established, at least one enzyme, typically a protease, is added to the defatted wheat germ slurry, with the enzyme designed to promote hydrolysis of the defatted wheat germ slurry. Any of a variety of enzymes can be used that will promote hydrolysis of the defatted wheat germ in a slurry having a pH of about 7. The proteases that are selected will be dependent in part upon the desired finished flavor of the HVP or savory flavor base. Different enzymes will break down different peptides giving the flavor base a different flavor profile. Also, different enzymes or proteases will function in different pH conditions so that it is desired to add different enzymes because as the hydrolysis of the defatted wheat germ occurs, the pH in the slurry will lower and it may be necessary to have enzymes which continue the hydrolysis reaction at a lower pH. Enzymes or proteases useful in the present invention include one or more of any enzyme exhibiting protease activity, including endoproteases and exoproteases. The preferred enzymes include *Aspergillus oryzae* (FLAVOURZYME™), ALCALASE®, and Aspergillus sp., and VISCOZYME™ The ALCALASE® is a proteolytic enzyme. The FLAVOURZYME™ is a protease that functions as both an exoprotease and an endoprotease. The VISCOZYME™ is a carbohydrase. Preferably, if all three enzymes are used, then the FLAVOURZYME™ will be added in an amount equal to at least 0.3% by weight of the defatted wheat germ slurry, the VISCOZYME™ will be added in an amount equal to at least 0.5% by weight of the protein found in the defatted wheat germ slurry, and the ALCALASE® enzyme will be added in an amount equal to at least 0.5% by weight of the protein found in the defatted wheat germ slurry. Preferably, the FLAVOURZYME™ is added in an amount equal to between 3% and 7%, the ALCALASE® is added in an amount equal to between 0.5% and 1%, and the VISCOZYME™ is added in an amount equal to at least 0.5%. Regardless of the particular enzyme, at least one enzyme equal to at least 0.5% by weight of the protein content of the defatted wheat germ is added. Once the enzymes are added, the defatted wheat germ slurry containing the enzymes is allowed to incubate for a sufficient time at a sufficient temperature to promote hydrolysis of the defatted wheat germ slurry. Generally, fermentation or incubation will occur at a temperature ranging between about 45° C. and about 60° C. for a period of time ranging between about 120 and about 165 hours. Preferably, the fermentation step will be carried out at a temperature equal to between about 50° C. and about 60° C. for a period of time ranging between about 5 and about 7 days.

After suitable enzymatic hydrolysis has occurred, it is preferred to inactivate the enzymes found in the defatted wheat germ slurry. Generally, this can occur by again pasteurizing or heat treating the slurry. For example, the slurry can be heated to a temperature of about 90° C. for one hour. Another method for inactivating the enzymes can include lowering the pH of the slurry and heating the slurry thereby inactivating the enzymes.

Next, the hydrolyzed defatted wheat germ slurry is filtered to separate insoluble material from soluble material, with the soluble material forming a protein hydrolysate. Any of a variety of means can be used to separate the filtrate fraction or protein hydrolysate from the insoluble portion of the defatted wheat germ slurry. Among the available means are membrane filtration and centrifugation. It is preferred, however, to filter the defatted wheat germ material through a membrane filter, such as a plate and frame filter. Regardless of the filter means used it is important to make sure that the carbohydrate and fiber material does not pass through the filter so that the carbohydrate and fiber material is not mixed with the protein hydrolysate. Thus, it is desired to remove insoluble material and unwanted flavor components.

It is preferred to then concentrate the soluble protein hydrolysate to a solids level ranging between about 60% and about 65% by weight of the protein hydrolysate. Any of a variety of different means can be used to concentrate the filtrate, however, it is preferred to use either an evaporator or reverse osmosis for evaporation and concentration of the filtrate. The concentrated filtrate is the flavor base or HVP of the present invention. The flavor base will have a unique and desirable flavor not found in yeast extract, HVP formed by acid hydrolysis, or HVP formed from soybean materials.

The savory flavor base can then have additional constituents added thereto and can be concentrated further to form either a savory flavor or a flavor enhancer. To the flavor base the color, pH, and flavor can be adjusted to have any of a variety of characteristics desired in the savory flavor or flavor enhancer. For example, salt and carriers may be added to the flavor base.

The flavor base, after the additional constituents are added thereto, can be further concentrated so as to form either a powder or a paste. If a powder is desired, it is preferred to spray dry the flavor base material to form the powder. If a paste is desired then a paste composition having 75% to 80% by weight solids will be formed by drying the flavor base in a vacuum dryer. The vacuum drying step may also be used to form the powder.

After formation of the paste or powder, the savory flavor or flavor enhancer is formed dependent in-part upon the flavors that were added thereto. The savory flavor and flavor enhancers can then be used in a variety of different food products.

The following examples are for illustration purposes only and are not meant to limit the claims in any way.

EXAMPLES

Example 1

A savory flavor base product was produced by hydrolyzing an amount of defatted wheat germ. The method involved forming a wheat germ slurry by mixing 38 kilograms of water or two (2) parts by weight, with 3.21 grams of NaCl or 8% to 10% by weight of the wheat germ slurry, and 8 kilograms or one (1) part by weight of defatted wheat germ having 30% by weight protein to form the wheat germ slurry. The wheat germ slurry was mixed in a reaction tank having a 100 liter capacity with agitators and being double jacketed for hot and cold water circulation. After formation of the wheat germ slurry, the reaction tank was heated to approximately 95° C. and the wheat germ slurry was pasteurized for approximately four (4) hours. Upon the conclusion of pasteurization, the pasteurized wheat germ slurry was cooled to approximately 50° C.

The pH of the pasteurized wheat germ slurry was taken and found to be 5.5, so that the pH of the pasteurized wheat germ slurry was then adjusted to approximately 7 by adding a 50% NaOH solution to the wheat germ slurry. The addition of the NaOH solution was equal to about 30 milliliters.

Following the addition of the NaOH solution, enzymes, or proteases, were added to the pasteurized wheat germ slurry in the reaction tank. The first enzyme added was ALCALASE® which was added in an amount equal to about 0.5% by weight of the protein content of the defatted wheat germ. As mentioned, the defatted wheat germ had 30% by weight protein so that 12 grams of the ALCALASE® enzyme was added. Next, 72 grams of a FLAVOURZYME™ enzyme was added, with this enzyme added in an amount equal to 3% by weight of the protein content of the defatted wheat germ. Next, 40 grams of a VISCOZYME™ enzyme were added, so that the VISCOZYME™ was added in an amount equal to 0.5% by weight of the protein found in the defatted wheat germ slurry. All three (3) enzymes were manufactured by NOVO NORDISK BIOCHEM NORTH AMERICA™ Franklington, N.C.

Fermentation of the defatted wheat germ was then allowed to proceed at 48° C. for approximately five days. At the end of five (5) days 50 kilograms of water were added to the hydrolyzed defatted wheat germ slurry and the mixture was then heated to 90° C. for one (1) hour to inactivate the enzymes so that hydrolysis would discontinue. The amount of water added was equal to the amount of the total slurry. The hydrolyzed protein mixture was then cooled to 50° C. and filtered to separate the insoluble material from the soluble material. The protein hydrolysate slurry was next filtered through a plate and frame filter to remove the insoluble cell wall material.

Filtering allowed for the isolation of a soluble protein hydrolysate or flavor base from the hydrolyzed wheat germ slurry. It was observed that the pH of the soluble protein hydrolysate or flavor base was 5.05 after five (5) days.

Example 2

Pilot-scale experiments were conducted so as to produce hydrolyzed vegetable protein (HVP) using three (3) different starting materials, and compare the results. Examples 3 and 4 discuss different starting material than the present Example. Soy, which contains an amount of protein equal to at least 50% by weight, and corn and wheat which each contain an amount of protein equal to 30% by weight, were the three (3) different vegetable protein starting materials for the present Example.

A 20 liter batch of a corn, soy, and wheat vegetable protein mixture was prepared by combining 1.46 kilograms each of corn, soy, and wheat with 6.0 kilograms of salt and 14 kilograms of water to form a vegetable protein solution. The vegetable protein solution was heated in a double jacketed reaction tank to 90° C. for three (3) hours, and mixed at 270 rpm to pasteurize the vegetable protein solution. The mixture was then cooled to 48° C. and the pH was adjusted to 7 using an NaOH solution.

Enzymes were then added to the vegetable protein solution at the following levels: 0.7% ALCALASE® (44 grams), 3.0% FLAVOURZYME™ (264 grams), 0.5% VISCOZYME™ (110 grams). The percent of enzyme relates to the amount of protein found in the vegetable protein solution, as explained in Example 1. Hydrolysis was then carried out for five (5) days at 48° C. On day five (5) the mixture was eluted up with an equal amount of water and heated to 90° C. for two (2) hours to inactivate the enzymes. The mixture was then centrifuged using a Westfalia SA-7 diskstack centrifuge to separate the insoluble solid material from soluble protein filtrate. The solids were discarded and the liquid supernatant or protein filtrate was then evaporated to 16–20% by weight solids. The material that was centrifuged yielded 15 liters of sludge or insoluble and 40 liters of protein hydrolysate. The 40 liters of protein hydrolysate contained 11.1% solids. This had an inadequate concentration of solids. Also, the flavor was undesirable.

The centrifugation step was conducted in a Westphalia SA-7 disk stack centrifuge. The centrifuge flow rate that appeared to give the best results on the protein material hydrolysate was 2.46 liters per minute, with 60 to 70 pounds per square inch of back pressure.

Example 3

A 100 liter batch of a wheat and soy mixture was prepared in the following manner. Eleven (11) kilograms of wheat and 11 kilograms of soy was combined with 8 kilograms of salt and 70 kilograms of water to form a wheat/soy solution. The process then followed the same procedure as outlined in Example 2. The enzymes were added at the following levels: 0.5% ALCALASE® (11 grams), 3.0% FLAVOURZYME™ (264 grams), 0.5% VISCOZYME™ (110 grams). Following enzyme inactivation, the same as Example 2, the mixture was evaporated to 16–20% solids.

This material produced a desirable appearing and smelling material. The solids after centrifugation were 16.5%. The batch of the present Example started with 40 liters and was concentrated to 32 liters. This raised the solids content to 18.9%.

Example 4

A 20 liter batch of soy was prepared in the following manner. Soy in the amount of 4.4 kilograms of soy was combined with 1.6 kilograms of salt and 14 kilograms of water to form a soy solution. The process then followed the same procedure as disclosed in Example 2. The enzymes were added at the following levels: 0.5% ALCALASE® (11 grams), 3.0% FLAVOURZYME™ (66 grams), and 0.5% VISCOZYME™ (22 grams). Following enzyme inactivation, the mixture was evaporated to 16–20% solids.

The batch of soy didn't work due to inadequate mixing in the tank. The soy material swelled greatly during the heating making a porridge-like mass. The mixer on the vessel used was unable to agitate the material. Therefore complete enzymatic digestion may not have occurred. The soy data in the report is from a previous experimental batch that had been run several weeks prior. This material was used for testing of the evaporation process and then disposed of prior to the second run.

| Sample I.D. | % Solids | % Moisture |
| --- | --- | --- |
| Wheat Before Treatment | 16.533 | 83.467 |
| Wheat After Batch I | 18.936 | 81.064 |
| Wheat After Batch II | 18.480 | 81.520 |
| CSW Before | 11.111 | 88.889 |
| CSW After | 11.353 | 88.647 |
| Soy Before | 8.853 | 91.147 |
| Soy After | 13.190 | 86.810 |

Example 5

A taste evaluation was conducted to compare the flavors between various HVP and yeast extract products, which are used as flavor enhancers and savory flavors, and the present flavor base. An informal group of nine people tasted the various products and recorded whether the products were salty, sweet and bitter, high in ribonucleotides, and beefy or chicken-flavored.

The flavors to be tested were formed by mixing an amount of dry flavor product with water so that a 2% aqueous solution was formed. The aqueous solution was formed at 100° F.

First, three MIXAROME™ products were tested and the flavors were recorded. The MIXAROME™ products were Product Nos. 58081, 5148, and 5083. The following table shows the panel's evaluations.

| 58081 | 5148 | 5083 |
| --- | --- | --- |
| Observed to be yeasty, slightly bitter, and high in ribonucleotides | Observed to be yeasty, slightly bitter, and having a good beefy flavor | Observed to be yeasty, slightly bitter, and having a chicken-type flavor. |

Three yeast products from Gillette Foods were tested. They were Rybo yeast product numbers 345, 144.20, and 144.10 products. The evaluations of the products by the panel are listed below:

| 345 | 144.20 | 144.10 |
| --- | --- | --- |
| Observed to be salty and have a meaty flavor | Observed to have a slightly bitter flavor and high in ribonucleotides | Observed to have a slightly bitter flavor and a chicken-type flavor |

A product produced by Food Ingredients Specialties (FIDCO) was tested. The Product Nos. were 4BE and 343. The product evaluations are listed below:

| 4BE | 343 |
| --- | --- |
| Product had a salty, meaty, beefy flavor | Product had a chicken-type, salty, beefy flavor |

A pair of products produced by Aroncia are shown below:

| HVP-SSDV | HVP-ICB 502 |
| --- | --- |
| Salty, less enhancement in beef and chicken type flavors | Salty, beefy flavor |

Finally, a product produced according to the present invention was tested. It was observed to have a less salty, less bitter flavor and was more flavorful beef and chicken-type applications.

Importantly, it was observed that the present invention produced a less bitter, less salty, HVP, which had good beef and chicken enhancement.

Thus, there has been shown and described a novel method for producing a savory flavor base which fulfills all of the objects and advantages sought therefor. It will be apparent to those skilled in the art, however, that many changes, variations, modifications, and other uses and applications for the subject methods and compositions are possible, and also changes, variations, modifications, and other uses and applications which do not depart from the spirit and scope of the invention are deemed to be covered by the invention which is limited only by the claims which follow.

What is claimed is:

1. A method for producing a savory flavor base, wherein said method consists of:
   (a) mixing salt, water, and a defatted wheat germ to form a cereal protein slurry, with said salt added in an amount ranging between about 5% and about 10% by weight of said cereal protein slurry and said protein added in an amount equal to between about 10% and about 20% by weight of said cereal protein slurry;
   (b) heating said cereal protein slurry at a temperature and time sufficient to pasteurize said cereal protein slurry;
   (c) adding at least one enzyme to said cereal protein slurry;
   (d) fermenting said cereal protein slurry for a period of time sufficient to hydrolyze said cereal protein;
   (e) inactivating said enzyme to prevent further fermentation; and
   (f) filtering said inactivated protein slurry to separate a protein hydrolysate from insoluble protein material.

2. The method of claim 1 wherein said enzyme is selected from the group consisting of *Aspergillus oryzae* enzymes, *Bacillus licheniformis* enzymes, and Aspergillus sp. enzymes, and combinations thereof.

3. The method of claim 2 wherein said *Aspergillus oryzae* enzymes are added in an amount equal to at least 0.5% by weight of the protein found in said vegetable protein slurry, said *Bacillus licheniformis* enzymes are added in an amount equal to 3% by weight of the protein found in said vegetable protein slurry, and said Aspergillus sp. enzymes are added in an amount equal to at least 0.5% by weight of the protein found in said vegetable protein slurry.

4. The method of claim 1 wherein said savory flavor base has additional constituents selected from the group consisting of salt, flavors, and combinations thereof added thereto to form a savory flavor or flavor enhancer.

5. The method of claim 4 wherein said savory flavor is dried and powdered.

6. A method for producing a savory flavor base, wherein said method consists of:
   (a) forming a defatted wheat germ mixture, with said defatted wheat germ mixture comprised of an amount of defatted wheat germ added in an amount equal to between about 10% and about 20%
   by weight of said defatted wheat germ mixture;
   (b) fermenting said defatted wheat germ mixture with an amount
   of enzyme for a sufficient amount of time to hydrolyze some of said
   defatted wheat germ and form a defatted wheat germ hydrolysate; and,
   (c) filtering said cereal protein hydrolysate so as to obtain said flavor base.

7. The method of claim 6 wherein said enzyme is selected from the group consisting of endoproteases and exoproteases.

8. The method of claim 7 wherein said enzyme is selected from the group consisting of *Aspergillus oryzae* enzymes, *Bacillus licheniformis* enzymes, and Aspergillus sp. enzymes.

9. The method of claim 6 wherein said flavor base is evaporated to form either a savory flavor or a flavor enhancer.

10. The method of claim 6, wherein said enzyme is added in an amount equal to at least 0.5% by weight of protein in said defatted wheat germ.

* * * * *

UNITED STATES PATENT AND TRADEMARK OFFICE
CERTIFICATE OF CORRECTION

PATENT NO.   : 6,251,443 B1
DATED        : June 26, 2001
INVENTOR(S)  : Chigurupati et al.

It is certified that error appears in the above-identified patent and that said Letters Patent is hereby corrected as shown below:

Column 6,
Line 42, change "Aspergillus sp." to -- *Aspergillus sp.* --
Line 43, after the word "VISCOZYME™" insert -- . --

Column 9,
Line 35, change "Example 2 ." to -- Example 2. --

Column 11,
Line 48, change "Aspergillus sp." to -- *Aspergillus sp.* --

Column 12,
Line 6, change "Aspergillus sp." to -- *Aspergillus sp.* --
Line 39, change "Aspergillus sp." to -- *Aspergillus sp.* --

Signed and Sealed this

Eleventh Day of June, 2002

*Attest:*

JAMES E. ROGAN
*Director of the United States Patent and Trademark Office*

*Attesting Officer*